United States Patent Office 3,314,961
Patented Apr. 18, 1967

3,314,961
HETEROCYCLIC CARBOXYLIC ACIDS AND
THEIR PRODUCTION
Jürg Rutschmann, Oberwil, Basel-Land, and Hans Kobel and Emil Schreier, Basel, Switzerland, assignors to Sandoz Ltd. (also known as Sandoz A.G.), Basel, Switzerland
No Drawing. Filed Aug. 27, 1964, Ser. No. 392,648
Claims priority, application Switzerland, Aug. 29, 1963, 10,637/63; Oct. 24, 1963, 13,053/63
6 Claims. (Cl. 260—285.5)

This invention provides a new heterocyclic compound, namely 6-methyl-$\Delta^{8,9}$-ergolene-8-carboxylic acid (of Formula I), and a process for its preparation using a new strain of Claviceps paspali Stevens et Hall. The invention further provides a process for the re-arrangement of compound I to form lysergic acid, a heterocyclic carboxylic acid that has been known for a long time, and which, inter alia, forms a constituent of the natural ergot alkaloids.

It is known that several strains of the fungus Claviceps paspali Stevens et Hall are capable of forming alkaloid-like compounds under suitable conditions of cultivation but the products obtained have heretofore always been derivatives of lysergic acid. It was therefore surprising that it has now been possible to obtain by cultivating a new strain of Claviceps paspali Stevens et Hall a carboxylic acid having a structure that had not hitherto been found in nature or obtained synthetically or semi-synthetically.

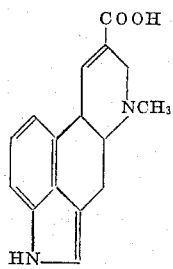

I

This new strain, which can be isolated from sclerotia grown on the grass Paspalum dilatatum in Portugal, and specimens of which have been deposited with the United States Department of Agriculture (Northern Utilization Research and Development Division) at Peoria, Ill., under the reference NRRL 3080, differs from all previously known strains of Claviceps paspali Stevens et Hall in that, when cultured in a nutrient medium, 6-methyl-$\Delta^{8,9}$-ergolene-8-carboxylic acid is produced as the main product.

This new strain of Claviceps paspali Stevens et Hall is also distinguished from all previously described strains of this fungus (see, for example, Proc. Roy. Soc. Serials B, 155, page 33), except that described in our application Serial No. 305,199, now U.S. Patent No. 3,219,545 (NRRL 3027), by the fact that it is capable of forming conidia in vitro. It is very important in the performance of microbiological processes on an industrial scale that the fungus concerned should be capable of forming conidia. Thus, with conidia it is possible to isolate single spores and thus to produce genetically uniform material. In addition, it is much easier to produce mutants by using X-ray and ultraviolet irradiation or chemicals from conidia than from sterile mycelia. Furthermore, blooming paspalum plants can be infected with conidia, so that sclerotia are produced naturally on the host plant, and these sclerotia are extremely suitable for preserving the strain. It is possible, for example, to produce from this stable material at any time, fresh inocula when the cultures in vitro degenerate after repeated passages through synthetic media. Conidia may also be lyophilised or freeze-dried and then stored indefinitely, which also makes it easy to preserve the strain. Finally, a conidium suspension is the most suitable for inoculating a nutrient solution because it is the easiest to measure and best suited for work under sterile conditions. Sterile mycelium, on the other hand, must first be homogenised in a mixer.

The 6-methyl-$\Delta^{8,9}$-ergolene-8-carboxylic acid obtained by the new process can be used to prepare in a semi-synthetic manner a number of new derivatives having valuable pharmacological properties.

In accordance with the invention, 6-methyl-$\Delta^{8,9}$-ergolene-8-carboxylic acid is converted in good yield by treatment with a base or by heating into lysergic acid, which is of considerable importance as an intermediate for the manufacture of valuable medicaments, inter alia, for example, the clinically widely used oxytocins ergobasine and methylergobasine, and 1-methyl-D-lysergic acid-(+)-butanolamide-(2'), the most potent known serotonin antagonist.

The isolation and culture of Claviceps paspali Stevens et Hall NRRL 3080 may be carried out, for example, in the following manner:

A small specimen of tissue is removed from the interior of a sclerotium under sterile conditions and transferred to beer wort agar. [Composition: 250 ml. of unhopped, light-colored beer wort (17% solids), 18 g. of agar-agar, distilled water to make 1 litre (pH 5.2).] A circular colony develops which after 14 days at 24° C. has a diameter of 15 mm.; it consists of a skin, about 1 mm. thick, of pseudo-sclerotial structure lying on the agar and on top of it there is a cushion of white aerial mycelium. A brown color diffuses into the agar. No conidia are formed.

This colony is broken up with a spatula into fractions which are transferred to a test tube with 12 cc. of the following agar culture medium:

Beer wort _____ ml__ 500
Cornsteep solids _____ g__ 60
Lactic acid _____ ml__ 1
Ammonium chloride solution to pH _____ 4.8
Agar-agar _____ g__ 20
Distilled water to make _____ litre__ 1

A small colony of white, subsequently reddish brown, mycelium forms round every inoculation specimen. 10 days later conidia begin to be formed by constriction at the tips of the hyphae. After 20 days a sufficient number of conidia is present to permit the preparation of an aqueous suspension with which 20 agar slant tubes (same agar as above) can be inoculated. These cultures are incubated at 24° C. The conidia germinate after 24 to 36 hours. After 6 days, the surface of the agar is evenly covered with a fine, white mycelium, and after 10 days a brownish grey, finely wrinkled mycelial blanket has developed which is in intimate contact with the agar and has only short aerial hyphae, from which conidia form by constriction. After 12 days, there appear at various spots in the mycelium centers which exude small droplets of a reddish-brown liquid. The droplets reach a diameter of 1 to 3 mm. and soon turn turbid owing to the presence of very numerous conidia. After 16 to 18 days the formation of conidia is practically complete. An agar slant culture in a test tube 2 cm. in diameter filled with 12 ml. of agar nutrient medium contains about $10^9$ conidia.

For cultivation by the submerged culture technique, a preculture is first prepared as follows. The medium used is a 4.5% aqueous malt extract solution of pH 5. One litre of this solution is sterilised for 20 minutes at 110° C. in a 2-litre conical flask, then inoculated with 6.10⁸ conidia of a 15-days old agar culture and incubated for 3 days on a rotating shaking machine at 24° C. A dense culture of fine mycelial flocks forms, each flock consisting of a loose bunch of hyphae of diameter 2 to 4 mm. No alkaloids can be identified.

To manufacture a large amount of preculture, glass fermenters containing 10 litres each of the same medium, are inoculated with 6.10⁹ conidia each and incubated for 3 days at 23° C. while being aerated with 6 litres of air per minute and stirred at 300 r.p.m. To inhibit foaming a silicone emulsion is used. The resulting fermenter cultures are identical with the shaken cultures. Particularly good results in preparing the main culture have been obtained with a nutrient solution that contains in 1 litre of distilled water.

| | |
|---|---|
| Sorbitol | g 50 |
| Succinic acid | g 36 |
| $KH_2PO_4$ | g 2 |
| $MgSO_4$ | g 0.3 |
| $FeSO_4.7H_2O$ | mg 1 |
| $ZnSO_4 7H_2O$ | mg 10 | and has been adjusted with ammonia to pH 5.4. This nutrient solution was inoculated with 10% of a 3-days old preculture and incubated in portions of 100 ml. each in 500 ml. conical flasks at 23° C. in a reciprocal shaking machine. Other cultures were grown in a similar manner in a stainless steel fermenter containing 170 litres of nutrient medium while aerating with 170 litres of air per minute and stirring, first at 70 and then at 180 r.p.m. Foaming was inhibited with a silicone emulsion.

In this manner cultures consisting of numerous identical mycelium particles are obtained; they have a diameter of about 5 mm. and have a globular, compact core of about 1 mm. diameter of pseudoparenchymatic tissue. This core has appendices of about 2 mm. length, arranged in a star shape, consisting of parallel hyphae. On completion of the cultivation after about 10 days, the mycelium is dark brown and the filtrate is an intense reddish brown color. The pH changes only insignificantly.

The culture filtrate prepared in this manner has a total alkaloid content (determined by colorimetry) of 620 mg. per litre, assuming an average molecular weight of 300. The composition of the alkaloid mixture, determined by paper-chromatography, is as follows:

| | Percent |
|---|---|
| 6-methyl-$\Delta^{8,9}$-ergolene-8-carboxylic acid mixed with minor proportions of lysergic acid and isoglysergic acid | 86.5 |
| Lysergic acid amide | 3.9 |
| Isolysergic acid amide | 3.9 |
| Ergobasine | 1.0 |
| Ergobasinine | 0.5 |
| Clavine alkaloids | 4.2 |

6-methyl-$\Delta^{8,9}$-ergolene-8-carboxylic acid can be isolated from the culture filtrate in a variety of ways. Advantageously, it is extracted from the culture filtrate with a cation exchange resin, for example Dowex 50 or Amberlite IR 120, then eluted from the resin with dilute ammonia, the eluate is evaporated, the pH value of the solution is adjusted to its isoelectric point (pH=5.5), and the product is then allowed to crystallise.

The 6-methyl-$\Delta^{8,9}$-ergolene-8-carboxylic acid obtained in this manner can be converted into lysergic acid by treatment with a base, preferably an alkali metal hydroxide, or by heating. It is of advantage, for example, to heat a solution of 6-methyl-$\Delta^{8,9}$-ergolene-8-carboxylic acid in dilute aqueous sodium hydroxide solution for some time at 100° C., whereupon the solution is cooled and its pH value is adjusted to the isoelectric point of lysergic acid.

Alternatively, the culture filtrate can be processed directly to yield lysergic acid, for example in the following manner: The solution is evaporated, 6-methyl-$\Delta^{8,9}$-ergolene-8-carboxylic acid is extracted from the residue with an alcoholic ammonia solution, the extract is heated to isomerise the 6-methyl-$\Delta^{8,9}$-ergolene-8-carboxylic acid to lysergic acid and the latter is then isolated from the solution as described above.

Alternatively, the culture filtrate can be passed over the cation exchange resin and the 6-methyl-$\Delta^{8,9}$-ergolene-8-carboxylic acid eluted therefrom with ammonia, and the ammoniacal solution heated, either as it is or in admixture with an alkali solution, so that the carboxylic acid is isomerised to lysergic acid.

The following examples illustrate the invention. The melting points are corrected.

*Example 1.—6-methyl-$\Delta^{8,9}$-ergolene-8-carboxylic acid*

5 litres of filtrate of a culture of Claviceps paspali Stevens et Hall NRRL 3080 (colorimetrically determined total content of ergoline derivatives: about 500 mg./litre, assuming an average molecular weight of 300) having a pH of 5.6 are filtered through a column containing an aqueous suspension of 500 g. of Amberlite IR 120 ($H^+$ form; diameter of column 2.8 cm., height 115 cm.). The liquid percolates at a rate of 500 ml. per hour. The column is washed with 1 litre of water and 6-methyl-$\Delta^{8,9}$-ergolene-8-carboxylic acid is then eluted with 5% ammonia. The percolate is collected in fractions of 500 ml. each and is tested by fluorescence in the ultraviolet region and by Keller's color reaction (using ferric chloride-glacial acetic acid in concentrated sulphuric acid) for its content of ergoline derivatives. The first four fractions (total 2 litres) are evaporated to 500 ml. under a pressure of 13 mm. Hg in a bath at 30° C., the solution is adjusted with glacial acetic acid to pH=5.5, the precipitated resin (Keller color reaction, negative) is filtered off, the filtrate is concentrated under vacuum to about 25 ml., 20 ml. of methanol are added, and the solution is boiled for a short time and then left to itself for several hours at 5° C. The acid which crystallises out is filtered off, washed with water and methanol, and dried in vacuo for 2 hours at 80° C. The following seven fractions of the ammoniacal percolate furnish on identical processing a further amount of crystalline 6-methyl-$\Delta^{8,9}$-ergolene-8-carboxylic acid.

For purification of the crude acid the crystalline products are combined and dissolved in 5% alcoholic ammonia. The solution is filtered and adjusted with 2N acetic acid to pH 5.5 and heated for a short while on the water bath. After a few hours the crystalline acid is filtered off, washed with water and methanol and dried under vacuum at 80° C. Melting point: 243–245° C. with decomposition. Optical rotation: $[\alpha]_D = -180°$ (in 0.1 N-sodium hydroxide solution). Color reactions according to Keller, van Urk and Ehrlich as with lysergic acid; thin-layer chromatogram on silica gel with alcohol+25% ammonia (9:1) as eluant: Rf value=0.4 to 0.45. When sprayed with Ehrlich reagent, the spot turns blue.

Ultraviolet spectrum in 0.1 N-sodium hydroxide solution: $\lambda_{max} m\mu/\log\epsilon = 217.5/4.56$; 282/3.79; 292/3.74. Minimum at 252 m$\mu$. Infrared spectrum: Characteristic bands at 3340, 2275 (broad) 1674 and 1580 cm.⁻¹ (in Nujol).

*Hydrochloride.*—The hydrochloride was prepared by treating the 6-methyl-$\Delta^{8,9}$-ergolene-8-carboxylic acid described above with dilute hydrochloric acid, and was then recrystallised from water and dilute hydrochloric acid. Melting point: 257–259° C. with decomposition. Optical rotation: $[\alpha]_D = -176°$ (in 0.1 N HCl). Ultraviolet spectrum as shown above for 6-methyl-$\Delta^{8,9}$-ergolene-8-carboxylic acid. Infrared spectrum: characteristic bands at 3380, 2600, 1708, 1660 (weak) and 1606 cm.⁻¹ (weak) (in Nujol).

6-methyl-$\Delta^{8,9}$-ergolene-8-carboxylic acid from the hydrochloride 2N-sodium bicarbonate solution is stirred dropwise into a suspension of 100 mg. of hydrochloride in 5 ml. of water until all has dissolved. The pH value of the solution is then adjusted with glacial acetic acid to 5.5, the whole is boiled for a short time, and after a few hours the crystalline acid is filtered off, washed with water and methanol, and dried at 80° C. under vacuum. Melting point: 245–247° C. with decomposition. Optical rotation $[\alpha]_D = -208°$ in 0.1 N-sodium hydroxide solution). In the thin layer chromatogram on silica gel with alcohol/25% ammonia (9:1) the compound is uniform. $Rf$ value=0.45. In ultra violet light the spot shows practically no fluorescence and give a blue color upon being sprayed with Ehrlich's reagent.

Example 2.—6-methyl-$\Delta^{8,9}$-ergolene-8-carboxylic acid

To produce 6-methyl-$\Delta^{8,9}$-ergolene-8-carboxylic acid from the filtrate of a culture of Claviceps paspali Stevens et Hall NRRL 3080, the procedure described in Example 1 is adopted, except that the cation exchange resin used is Dowex 50 instead of Amberlite IR 120. The resulting crystalline, crude 6-methyl-$\Delta^{8,9}$-ergolene-8-carboxylic acid has the properties described in Example 1.

Example 3.—Lysergic acid 500 mg. of the crude, crystalline 6-methyl-$\Delta^{8,9}$-ergolene-8-carboxylic acid, isolated as described in Example 1, are heated in 10 ml. of 2N-sodium hydroxide solution for 2 hours on a water bath; the hot solution is treated with active carbon and the filtrate adjusted to pH=5.5 with dilute hydrochloride acid and glacial acetic acid. After a few hours, the resulting crystalline lysergic acid is filtered off, washed with water and methanol and dried at 80° C. under vacuum. Melting point: 245–247° C. with decomposition.

The lysergic acid prepared in this manner is identical with the compound described in the literature.

We claim:
1. 6-methyl-$\Delta^{8,9}$-ergolene-8-carboxylic acid.
2. Process for the production of lysergic acid, which comprises rearranging 6-methyl-$\Delta^{8,9}$-ergolene-8-carboxylic acid by addition of an aqueous base thereto and adjusting the pH of the resulting lysergic acid solution to the isoelectric point of lysergic acid.
3. Process as claimed in claim 2 in which the ergolene-carboxylic acid is treated with an alkali metal hydroxide.
4. A process for the production of lysergic acid, which comprises rearranging 6-methyl-$\Delta^{8,9}$-ergolene-8-carboxylic acid by addition of an aqueous base thereto at an elevated temperature and adjusting the pH of the resulting lysergic acid solution to the isoelectric point of lysergic acid.
5. A process according to claim 4 wherein the base is an alkali metal hydroxide.
6. The hydrochloride of 6-methyl-$\Delta^{8,9}$-ergolene-8-carboxylic acid.

References Cited by the Examiner

UNITED STATES PATENTS

| | | | |
|---|---|---|---|
| 2,265,207 | 12/1941 | Stoll et al. | 260—285.5 |
| 2,796,419 | 6/1957 | Kornfeld | 260—285.5 |
| 2,936,266 | 5/1960 | Windisck | 195—81 |
| 3,038,840 | 6/1962 | Chain | 195—81 |
| 3,060,104 | 10/1962 | Chain | 195—81 |
| 3,113,133 | 12/1963 | Hofmann | 260—285.5 |
| 3,162,640 | 12/1964 | Chain et al. | 260—285.5 |

OTHER REFERENCES

Smith et al., J. Chem. Soc. (London) 1936, pages 1440–4.

ALEX MAZEL, *Primary Examiner.*

NICHOLAS S. RIZZO, HENRY R. JILES, *Examiners.*

DONALD G. DAUS, *Assistant Examiner.*